United States Patent [19]
Chen et al.

[11] Patent Number: 5,844,548
[45] Date of Patent: Dec. 1, 1998

[54] STABLE WIRELESS POINTING DEVICE FOR A TABLET

[75] Inventors: Chien-Hung Chen; Jung-Chih Hsu; Che-Wei Hsu, all of Hsin Tien, Taiwan

[73] Assignee: Ace Cad Enterprise Co., Ltd., Taipei Hsien, Taiwan

[21] Appl. No.: 881,577

[22] Filed: Jun. 24, 1997

[51] Int. Cl.⁶ .............................. G08C 21/00; G09G 5/00
[52] U.S. Cl. .................. 345/179; 345/184; 178/18.01; 178/18.03; 178/19.01; 178/19.03; 178/20.02
[58] Field of Search .................................. 345/179, 180, 345/184; 178/18.01, 18.06, 18.07, 19.01, 19.03, 20.01, 20.02, 20.04

[56] References Cited

U.S. PATENT DOCUMENTS

| | | | |
|---|---|---|---|
| 5,007,085 | 4/1991 | Greanias et al. | 178/18 |
| 5,308,936 | 5/1994 | Biggs | 178/18 |
| 5,369,227 | 11/1994 | Stone | 178/18 |
| 5,557,076 | 9/1996 | Wieczorek | 178/19 |

*Primary Examiner*—Vijay Shankar
*Attorney, Agent, or Firm*—Bacon & Thomas

[57] ABSTRACT

A system for determining a position of a wireless pointing device relative to the plane of a conductor grid, by inducing currents in the conductor grid, includes a pointing device and a digitizer tablet on which is situated the conductor grid. The pointing device includes an oscillator, a resonator circuit, and a coil to which a tuned alternating current is supplied, and which emits an alternating signal that induces currents in the conductor grid. The power supply of the pointing device includes a DC-DC converter circuit for enabling the power supply to operate with only one low voltage battery, and a voltage stabilizer for preventing drift in the frequency and phase of the signal emitted by the pointing device.

4 Claims, 6 Drawing Sheets

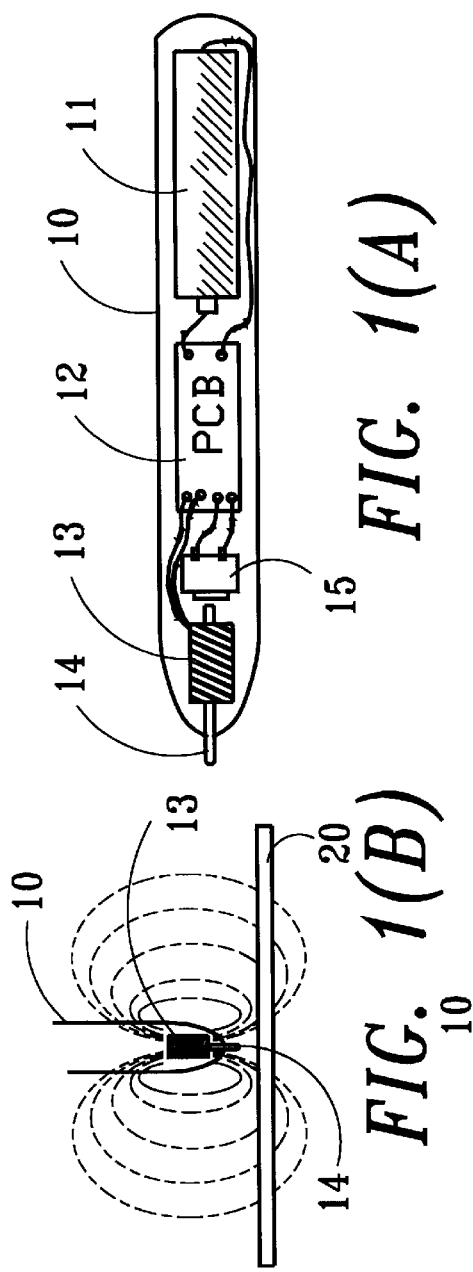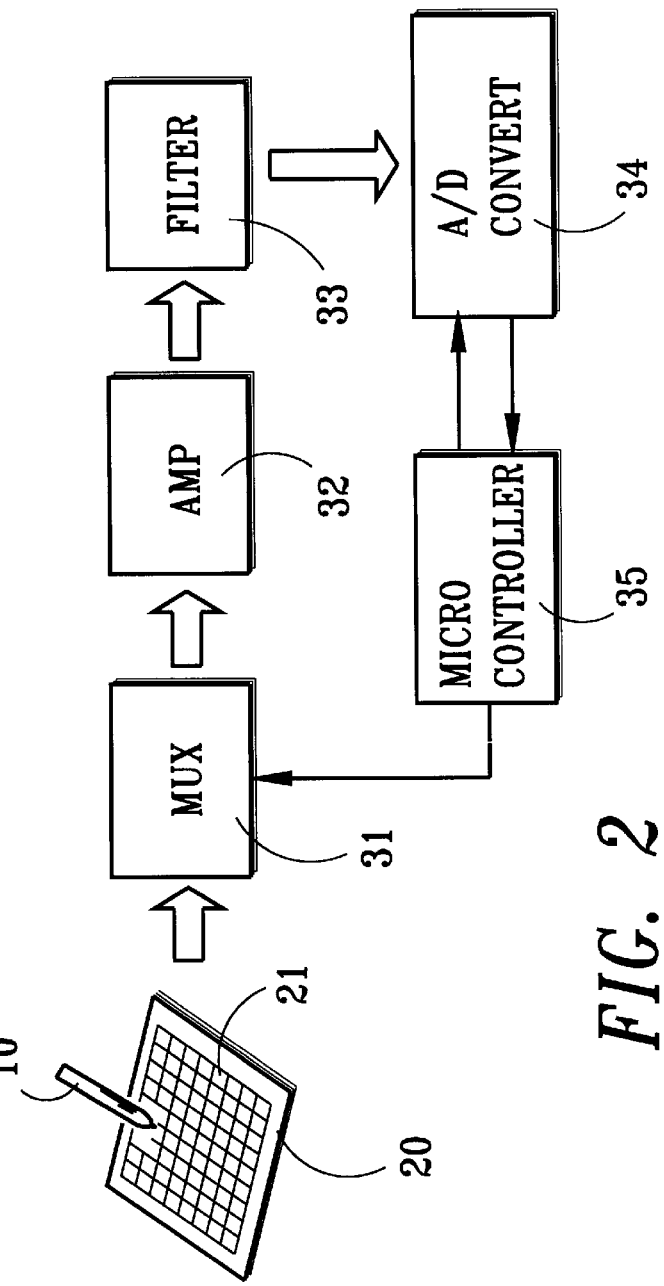

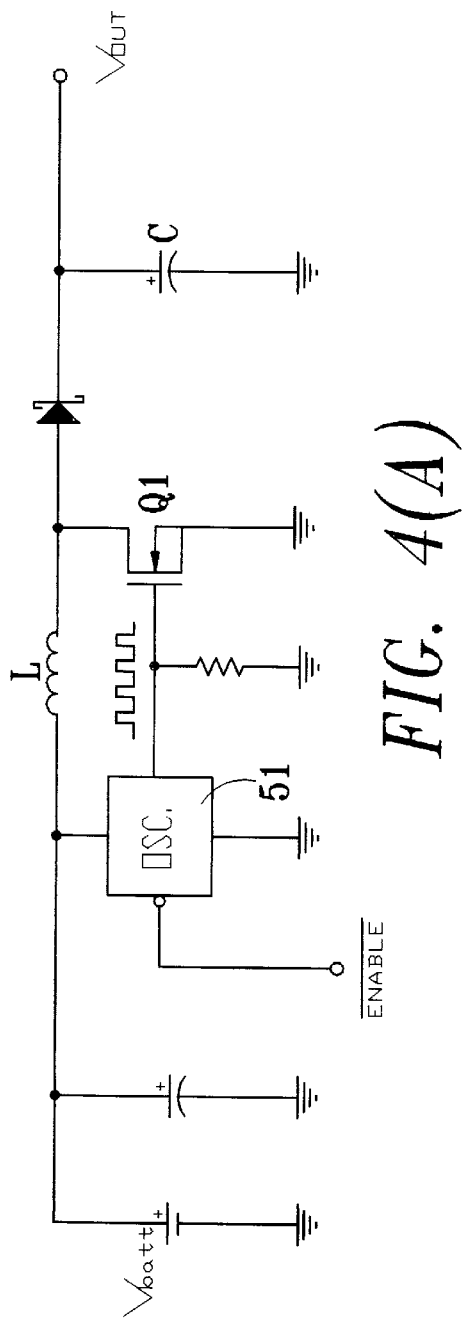
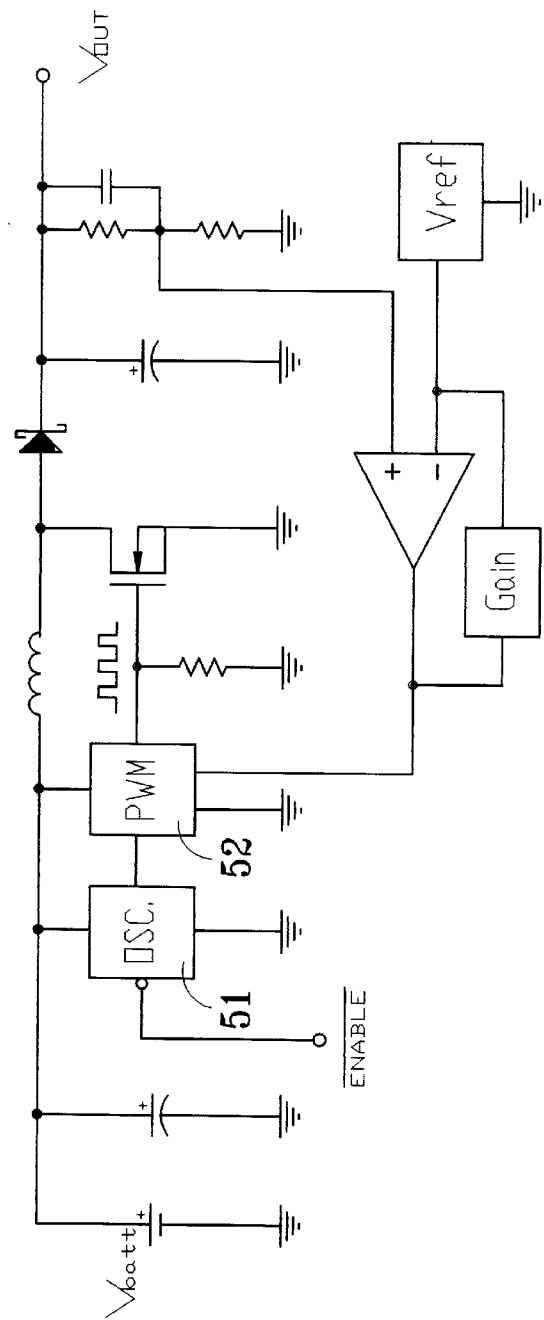
FIG. 4(A)
FIG. 4(B)

STABLE WIRELESS POINTING DEVICE FOR A TABLET

BACKGROUND OF THE INVENTION

1. Field of the Invention

The present invention relates to a stable wireless pointing device for a tablet, and especially to a wireless pointing device which only requires a single low voltage battery, and which is arranged so that the lifetime of the battery is prolonged and the working frequency will not be affected by variations in the battery voltage.

2. Description of the Prior Art

In the prior art, for example, U.S. Pat. Nos. 5,373,118 and 5,218,174, a coil is placed in the front end of a wireless pen, an oscillator circuit is used to generate an AC signal with a predetermined frequency, and a resonant circuit which includes inductors and capacitors is caused to resonate with the AC signal so that the signal may be emitted out through said coil.

More specifically, in U.S. Pat. No. 5,218,174, a sense line grid made up of two sets of spaced parallel conductors is provided on a tablet equipped with a scanning means to scan conductors sequentially to detect the presence of a signal induced by the pen. Scanning from the first conductor to the last one is first carried out in the X direction and then in the Y direction, by supplying induced signals from a selected conductor and the next adjacent conductor as inputs to a differential amplifier. In addition, another four conductors are arranged to form a set of synchronous signal conductors which loops across the sense line grid and extends between the spaced parallel conductors. When the induced signal from the synchronous signal conductor has passed through a phase lock loop circuit, a synchronous pulse signal which is synchronized with the AC signal emitted by the pointing device is generated.

The output of the differential amplifier is connected to one input of a synchronous phase detector, the other input being supplied with the synchronous pulse signal from the phase lock loop circuit. When the scanning is performed from one end of the pen to another end of the pen, an output signal with varied polarity and amplitude is generated. Next, this signal is input to an analog to digital converter, and the digitized values for the phase and amplitude of the signal are further input to a microprocessor for calculating position of said pointing device. In addition, a pressure sensitive resistor is arranged within the pointing device. In addition, a pressure sensitive resistor is arranged within the pointing device for sensing the pressure on the pen tip applied by the user and the pressure can be converted to a related voltage by a converter circuit. This voltage is further used to control a voltage variable capacitor. Since this voltage variable capacitor is a part of the resonant circuit, the change in capacitance will also change the frequency of the emitted AC signal, so that a frequency counting means provided in a receiver at an end of the tablet for sensing the AC signal can be used to determine the pressure on the pen tip applied by the user.

Another implementation of a wireless pen for a tablet is disclosed in U.S. Pat. No. 5,214,509, which describes a method for transferring the synchronous pulse signal. A battery operated oscillator circuit in the pointing device generates an AC signal of a predetermined frequency and the signal is then emitted by a coil. Another digital circuit in the pointing device is used to divide the frequency by two to obtain a second frequency which is a rectangular signal. The pen tip is made of a metal material and connected to the second frequency, and a conductive plate is disposed above said sense line grid so that when the pen is put inside the area on the surface of the sense line grid, the second frequency can be received by the conductive plate from the pen tip through a capacitance coupling. The received signal is amplified and converted to a synchronous phase signal through a phase lock loop circuit. In addition, at the receiving end of the tablet, a conventional tablet scanning means is used to sequentially select the conductor on the sense line grid to obtain the phase and amplitude of each induced signal. The phase signal of the induced signals is compared with the synchronously phase to detect the zero-crossing point during the change of the polarity of the phase of the inducing signal. By detecting the zero-crossing point and the signal amplitude, the position of the pointing device may be obtained.

The methods mentioned above have the following problems:

1. When the wireless pointing device is operated by a battery, the voltage must be high enough to drive the IC in the pointing device. But, in general, the ICs usually must be operated above 3V or 3.3V. Therefore, in a practical design, two or three commonly used 1.5V batteries must be serially connected to drive the ICs. However in a practical wireless pen, there is insufficient space to put such batteries, with the exception of button type battery cells. Furthermore, the capacitance of a button type battery cell is very low, and the current consumption is high when the wireless pen has to emit the signal through a coil. As a result, the output voltage of battery will quickly reduce to a level which is not sufficient to drive the IC, so this design is not pratical.

2. Within the wireless pen, an oscillating circuit is used to generate an AC signal with a fixed predetermined frequency and the AC signal is employed to drive a resonant circuit through a driving circuit. The coil in the resonant circuit is responsible for emitting a signal. However, the output voltage of the battery will reduce continuously as time goes by, and the operation of said oscillating circuit will become unstable. The key point is that the output frequency of the oscillating circuit will drift, and although the resonant circuit is tuned to the predetermined frequency, the phase of the emitted AC signal will also drift due to the frequency drift. Since in a conventional scanning operation, the AC phase of the emitted signals must be obtained for scanning the position of said pointing device, if the resonant circuit is not working at the predetermined frequency due to the frequency drift, the position scanning of said pointing device is dramatically affected.

3. In some practical designs, such as the one disclosed in U.S. Pat. No. 5,218,174, some messages are transferred through the frequency of the emitting signal. If the oscillating frequency drifts due to decreasing of the battery voltage, the sense line grid will not receive the desired frequency and will cause an error. When the IC is operated at low voltage, the variation in supplied voltage will especially affect the oscillating frequency. In the case two 1.5V batteries are serially connected to obtain a 3.0V voltage, it is possible that even when the voltage source is just reduced to 2.8V, the output frequency generated by the oscillating circuit may have been drifted out of acceptable range so that the user has to replace a new battery. It is not only inconvenient to the user, but also is not economic.

SUMMARY OF THE INVENTION

From the aforementioned description, it is apparent that the pointing device of the prior art still needs some improvement. Accordingly, the inventor of the present invention has studied for a long time how to improve the wireless pen.

The object of this invention is making a wireless pen which uses only one low voltage battery to drive the circuit in the wireless pen.

Another object of this invention is making a wireless pen and the operating frequency can stay tuned at predetermined range of frequency. And the operating frequency will not be affected by the variation of battery voltage.

BRIEF DESCRIPTION OF THE DRAWINGS

FIG. 1(A) shows a wireless pointing pen.

FIG. 1(B) shows how the pointing pen works.

FIG. 2 is a block diagram of a tablet.

FIG. 4(A) shows how switching type DC-DC converter works.

FIG. 4(B) shows how a switching type DC-DC converter works which is combined with a voltage regulating circuit.

DETAILED DESCRIPTION OF THE PREFERRED EMBODIMENT

Figure 3:
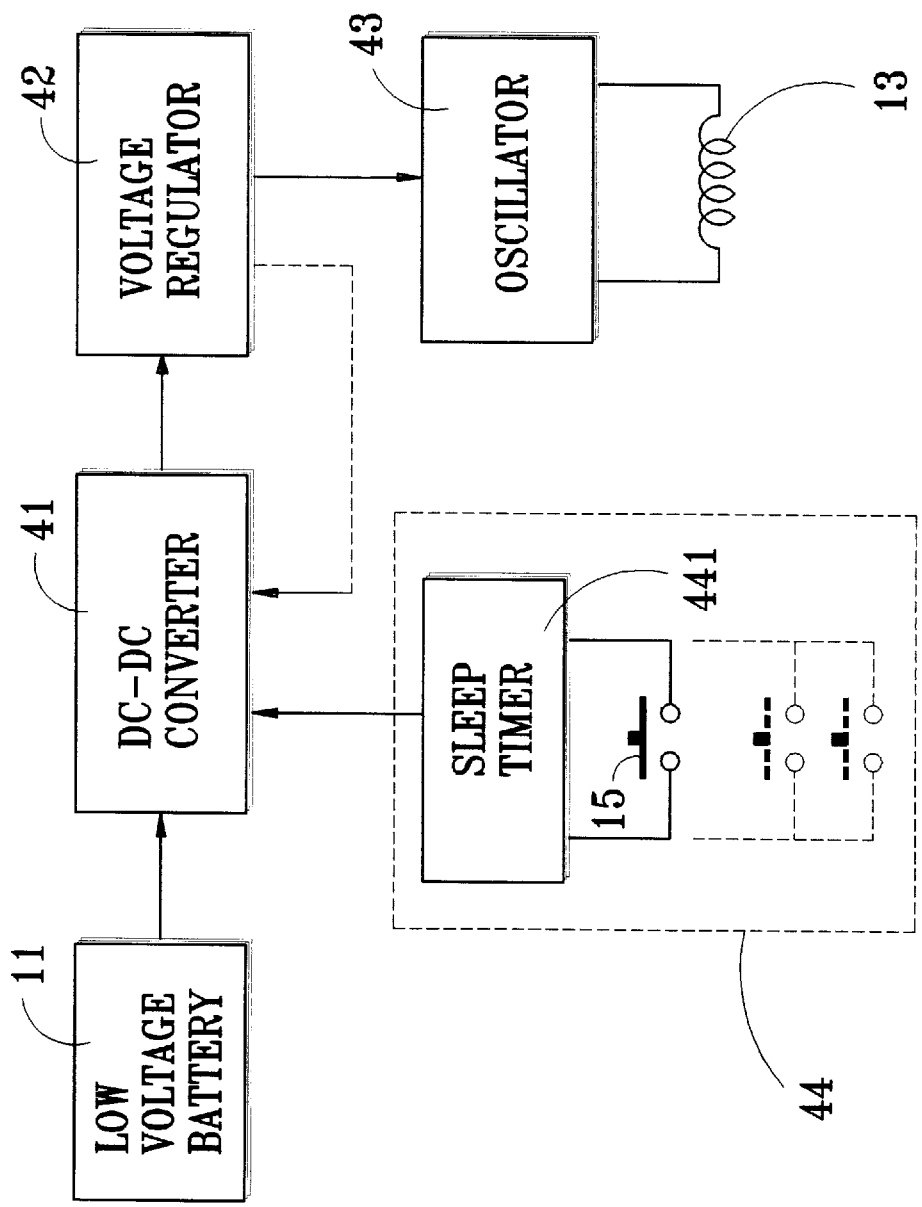
FIG. 3 is a block diagram of a wireless pen.

FIG. 1(A) shows an embodiment of a wireless pointing pen 10. FIG. 1(B) shows how the pointing pen 10 works. As shown therein, a battery 11 is connected to a PCB 12. An AC signal is generated by a circuit on the PCB 12. The AC signal is emitted through a coil 13 placed near the pen tip 14. When the pen tip 14 is put on the sense line grid 21 of tablet 20, an induced AC current can be obtained from the sense line grid 21.

In the present invention, the tablet under the wireless pen 10 adopts the technology of a pending patent application of the present inventor. The block diagram of the tablet is shown in FIG. 2. The sense line grid 21 is made up of a plurality of spaced parallel conductors arranged so that the conductors adjacent to the wireless pen can induce an AC signal with an amplitude related to the distance between the conductors and the wireless pen. Through a multiplexing selector 31, one conductor can be selected each time from said spaced parallel conductors to obtain the induced AC signal for further processing. The signal amplifier 32 and filter 33 can be used to convert the induced signal to a DC signal representing the amplitude of the induced AC signal, and the DC signal is input to an analog to digital converter 34 so that the DC signal is converted to a digital value. A microprocessor 35 can receive the digitalized number of the induced signals of the selected conductors. Moreover, the conductor which is nearest to the wireless pen 10 will induce the largest signal. In this way, all the conductors in the sense line grid 21 can be scanned and the largest signal found, allowing the position of the wireless pen 10 on the tablet 20 to be determined.

FIG. 3 is a block diagram of the wireless pen 10 of the present invention. The power supply is a low voltage battery 11, for example, a battery of 1.5V, and then a DC-DC converter 41 is employed to convert the voltage of the battery 11 to a higher voltage. Next the said higher voltage is passed through a voltage regulating circuit 42 and then the output signals are fed back to control the DC-DC converter 41 to generate a stable voltage source.

The stable DC voltage source is supplied to an oscillating circuit 43 so that the oscillating circuit may be operated in a stable frequency no matter how the output voltage of battery 11 drifts, and so that the operating frequency will not drift until the output voltage of the battery 11 is reduced to a level that the DC-DC converter 41 can not work normally.

In order to further prolong the lifetime of the battery, a sleeping control circuit 44 is added. Sleeping control circuit 44 contains a timer 441 to count the time period that the users stops using the wireless pen 10. At least one trigger switch 15 is added to the wireless pen and is placed behind the pen tip or the lateral side of the pen for detecting whether the user is holding and using the wireless pen 10. If yes, the switch 15 is triggered to reset the timer 441. If the user did not trigger the switch 15 for a period fo time, the timer 441 will output a signal so that the DC-DC converter will stop operation, and then the DC-DC converter 41 will enter a power-saving mode. As the user holds the wireless pen again, the switch 15 is triggered and the timer 441 is reset and the DC-DC converter 41 is activated. Therefore, the lifetime of said battery is further prolonged.

FIG. 4(A) shows the operation of a switching type DC-DC converter comprising an oscillating circuit 51 which can generate a fixed frequency to control a transistor Q1 to generate a AC current on an inductor L. When the inductor L is cut off, the stored electric energy will be released, and it will charge the output capacitor. Since the battery is connected serially to the inductor L when charging the output capacitor, thereafter, the DC voltage Vout on the capacitor C will be higher than the battery voltage Vbatt. Furthermore, the duty cycle on the output of the oscillating circuit 51 will affect the output voltage Vout of the capacitor C, and the frequency of the oscillating circuit 51 will also affect the conversation efficiency, making it important to properly select the frequency for the switching type DC-DC converter. Nevertheless, the output voltage Vout is still affected deeply by the voltage Vbatt.

FIG. 4(B) shows the operation of a switching type DC-DC converter combined with a voltage regulating circuit, and a pulse width modulating circuit 52. The pulse width modulating circuit 52 is added for control of the output voltage Vout. A feedback signal is obtained from the output voltage Vout and compared with a fixed reference voltage Vref, and the comparison result is supplied to the pulse width modulating circuit 52. Thus the output voltage will be stable and not be affected by the variation of Vbatt.

Figure 4C:
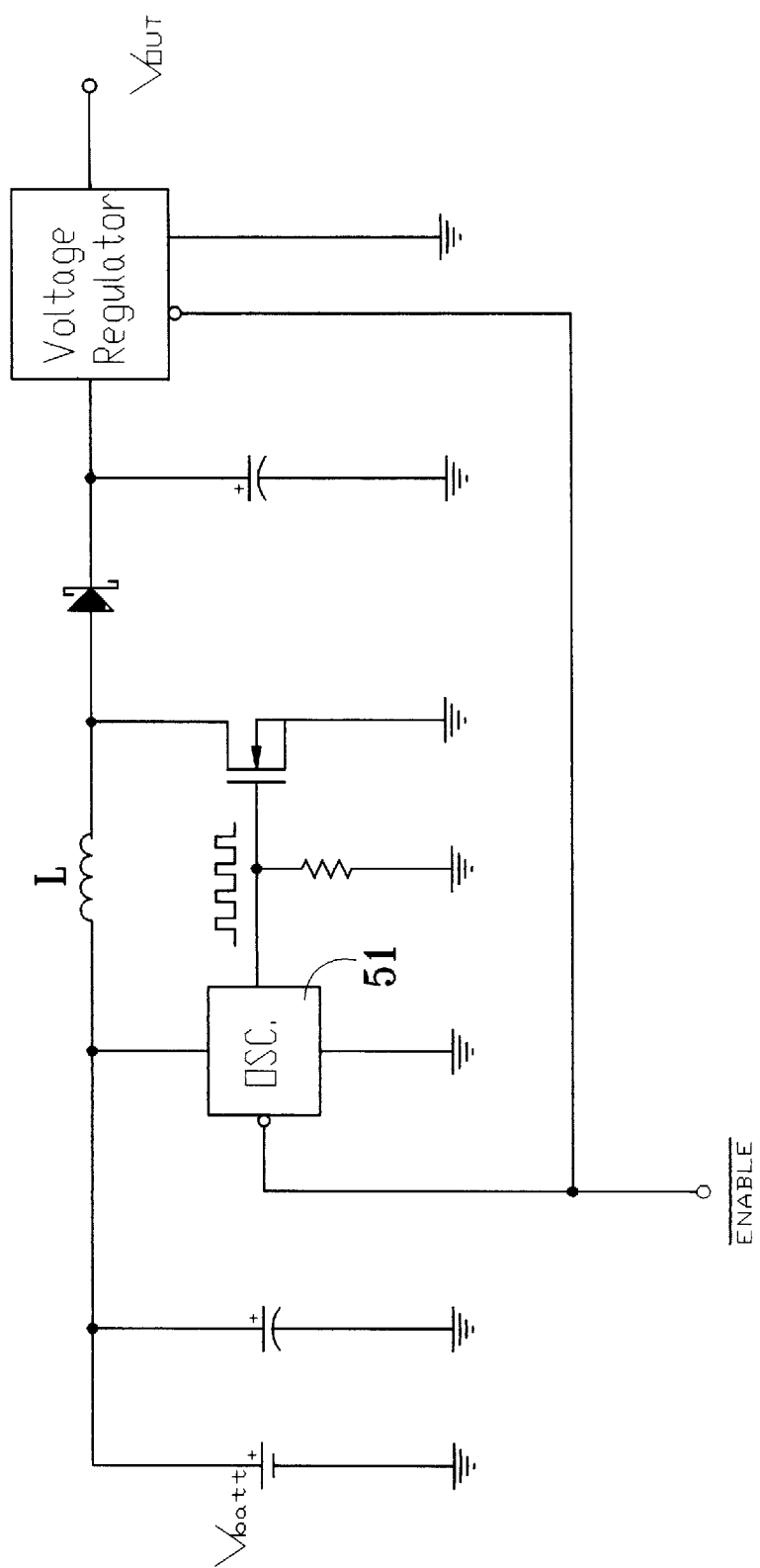
FIG. 4(C) shows how a switching type DC-DC converter works with an additional voltage regulating circuit.

FIG. 4(C) shows the operation of a switching type DC-DC converter which has a voltage regulating circuit after it. IN this example, a conventional linear voltage regulating circuit is added to the basic structure of an exchanging type DC-DC converter, in which case feedback from the output voltage Vout is not needed to control the switching type DC-DC converter, and the circuit structure is simpler.

Figure 5:
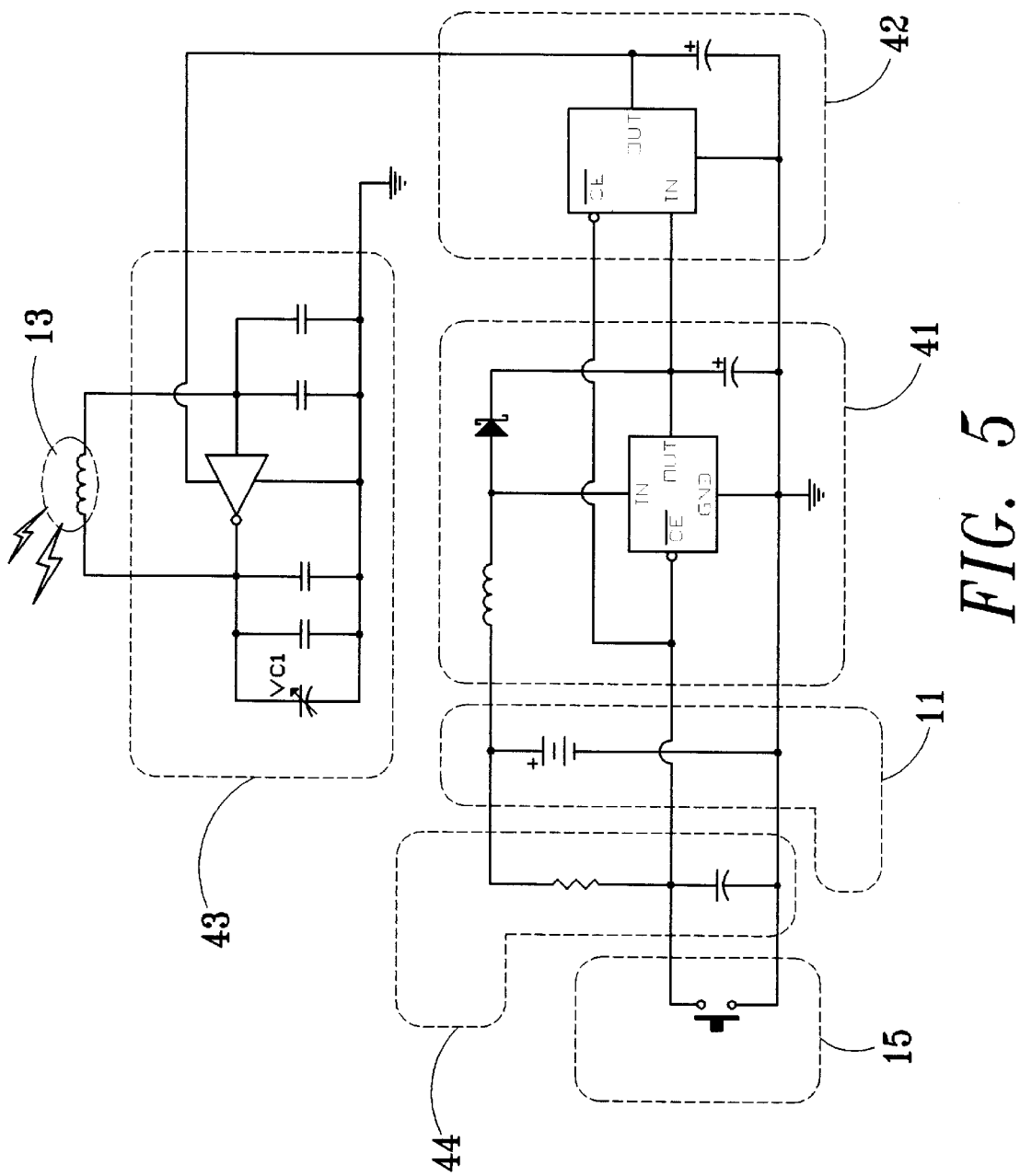
FIG. 5 is a schematic diagram of the circuit of this invention.

FIG. 5 shows in detail the circuit of an embodiment the present invention, implementing to the block diagram shown in FIG. 3, using the voltage regulating arrangement shown in FIG. 4(C). The output voltage of the voltage regulating circuit is designed to be 3.3V, so that a common used CMOS IC can be used in the circuit to generate signals, which is helpful for designing and manufacturing of the product.

Figure 6:
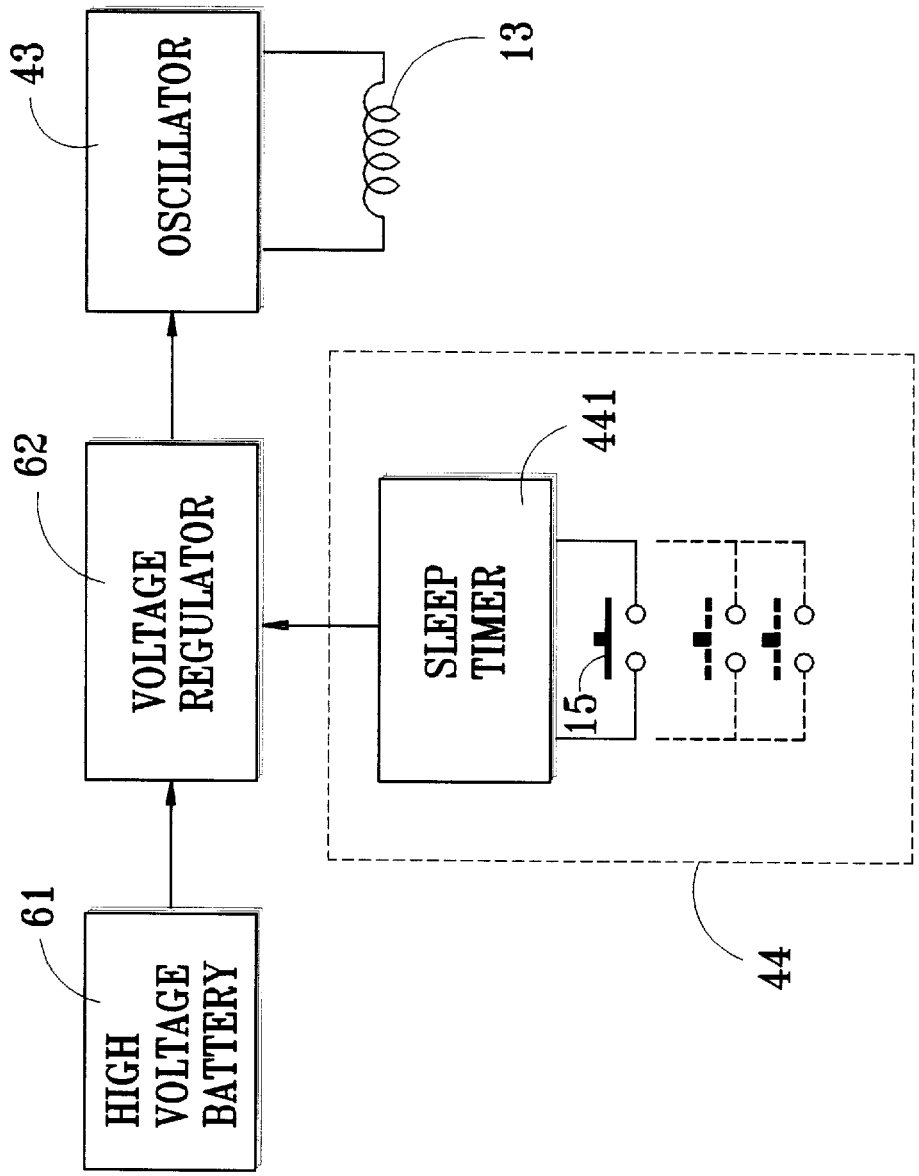
FIG. 6 shows how a voltage battery works with a voltage regulating circuit.

Instead of using a wireless pen, another pointing device such as a cursor puck, which is a device shaped like a mouse with multiple key switches, may be used. In that case, there should be a sufficient space to put a battery of higher voltage in, for example, a 3.6 V lithium battery or three 1.5 V batteries. Thus, a sufficient voltage may be used to drive a common used ICs without using a DC-DC converter. But if the IC is driven by the battery voltage directly, the generated frequency will still drift due to the variation of battery voltage, and the battery lifetime is still short. Another embodiment of the present invention is shown in FIG. 6. In this embodiment, a voltage regulating device 62 is added after the battery 61 to stabilize the output voltage. Thus, the tolerance of voltage variation is increased. Moreover, use of the DC-DC converter further reduces the power consumption of the pointing device and the lifetime of the battery is prolonged.

Many changes and modification to the above described embodiments of this invention can, of course, be carried out without departing from the scope thereof. Accordingly, to promote the progress in science and the useful arts, the invention is disclosed and is intended to be limited only by the scope of the appended claims.

What is claimed is:

1. A system for determining a position of a wireless pointing device, comprising:

a movable pointing device including a circuit arranged to generate and emit alternating excitation signals having a predetermined frequency range; and a position determining device relative to which the position of the movable pointing device is determined, wherein said position determining device comprises:

conductors in which currents are induced by said excitation signals, said conductors being situated in a plane and arranged such that said induced currents are indicative of a position of said movable pointing device relative to said plane, said conductors including a first set of spaced parallel conductors and a second set of spaced parallel conductors disposed orthogonal to an overlapped with said first set of spaced parallel conductors;

a multiplexer arranged to select a conductor from said two sets of spaced parallel conductors; and a processing unit arranged to control said multiplexer and cause it scan said two sets of parallel spaced conductors and to receive and process said induced currents to thereby determine the position of the pointing device relative to said plane, and wherein said movable pointing device comprises:

a direct current voltage supply including at least one electric power storage device;

a voltage regulator arranged to convert a voltage output by the direct current voltage supply into a direct current having a stabilized output voltage, said stabilized output voltage being supplied to said circuit arranged to generate said alternating signal so that a frequency and phase of said alternating signal are not affected by changes in the voltage output of the direct current voltage supply.

2. A system as claimed in claim 1, wherein the direct current voltage supply further includes a voltage converter for converting said direct current voltage to a higher direct current voltage in order to enable the pointing device to operate with only one low voltage battery as the direct current voltage supply.

3. A system as claimed in claim 1, wherein said voltage regulator includes a feedback circuit arranged to compare a voltage output of an oscillator circuit with a voltage reference and to adjust by pulse width modulation said oscillator circuit voltage output.

4. A system as claimed in claim 1, wherein said voltage regulator includes a voltage stabilizer circuit connected between an oscillator circuit and an output coil of said pointing device.

* * * * *